United States Patent
Ye

(10) Patent No.: US 10,142,331 B2
(45) Date of Patent: *Nov. 27, 2018

(54) AUTHENTICATION FOR APPLICATION

(71) Applicant: Alibaba Group Holding Limited, Grand Cayman (KY)

(72) Inventor: Dong Ye, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/367,267

(22) Filed: Dec. 2, 2016

(65) Prior Publication Data
US 2017/0085559 A1    Mar. 23, 2017

Related U.S. Application Data

(63) Continuation of application No. 14/527,696, filed on Oct. 29, 2014, now Pat. No. 9,544,279.

(30) Foreign Application Priority Data

Oct. 30, 2013   (CN) .......................... 2013 1 0526656

(51) Int. Cl.
*H04L 29/06*    (2006.01)
*H04W 12/06*    (2009.01)
(Continued)

(52) U.S. Cl.
CPC ...... *H04L 63/0853* (2013.01); *H04L 63/0492* (2013.01); *H04L 63/08* (2013.01);
(Continued)

(58) Field of Classification Search
CPC ............... H04L 63/0493; H04L 63/101; H04L 63/0853; H04L 63/0876; H04L 63/08;
(Continued)

(56) References Cited

U.S. PATENT DOCUMENTS

| 7,748,618 B2 | 7/2010 | Vawter |
| 7,784,684 B2 | 8/2010 | Labrou |

(Continued)

FOREIGN PATENT DOCUMENTS

| JP | 2005352710 A | 2/2005 |
| JP | 2011004214 A | 6/2011 |

(Continued)

OTHER PUBLICATIONS

Office action for U.S. Appl. No. 14/527,696, dated Nov. 18, 2015, Ye, "Authentication for Application ", 17 pages.

(Continued)

*Primary Examiner* — Ayoub Alata
(74) *Attorney, Agent, or Firm* — Lee & Hayes, PLLC

(57) ABSTRACT

The present disclosure provides a method, terminal, and system for authentication with respect to an application. The present techniques may be applicable at a terminal with near-field communication function. When a particular operation of the application is triggered, a near-field device within a certain distance of a terminal is detected. An identification of the near-field device is obtained. The identification is sent to a server to request the server to determine whether the near-field device is a particular near-field device corresponding to the particular operation. A result of authentication performed by the server according to the identification is obtained. A following processing is applied to the particular operation according to the result of authentication. The present techniques ensure safety of operations of the application operated at the terminal.

20 Claims, 4 Drawing Sheets

(51) Int. Cl.
*H04W 12/08* (2009.01)
*H04W 4/80* (2018.01)

(52) U.S. Cl.
CPC ........ *H04L 63/0876* (2013.01); *H04L 63/101* (2013.01); *H04W 4/80* (2018.02); *H04W 12/06* (2013.01); *H04W 12/08* (2013.01)

(58) Field of Classification Search
CPC .. H04L 63/0492; H04W 4/008; H04W 12/08; H04W 12/06; H04W 4/80
See application file for complete search history.

(56) References Cited

U.S. PATENT DOCUMENTS

| | | | |
|---|---|---|---|
| 2007/0052525 | A1 | 3/2007 | Quan et al. |
| 2007/0082703 | A1 | 4/2007 | Van Kleef |
| 2007/0118891 | A1* | 5/2007 | Buer ................ G06F 21/34 726/8 |
| 2007/0265984 | A1 | 11/2007 | Santhana |
| 2008/0060059 | A1* | 3/2008 | Yoshida ............ G06F 21/31 726/4 |
| 2011/0169654 | A1* | 7/2011 | Ketari ............ G08B 13/1427 340/687 |
| 2012/0075059 | A1 | 3/2012 | Fyke et al. |
| 2012/0135711 | A1 | 5/2012 | Jabara |
| 2012/0254955 | A1 | 10/2012 | Suginaka |
| 2012/0260311 | A1 | 10/2012 | Kang |
| 2013/0009756 | A1 | 1/2013 | Lu |
| 2013/0085796 | A1* | 4/2013 | Ruffolo ............. G06Q 10/105 705/7.18 |
| 2013/0185769 | A1 | 7/2013 | Jian |
| 2015/0121486 | A1 | 4/2015 | Ye |

FOREIGN PATENT DOCUMENTS

| | | |
|---|---|---|
| JP | 2012039313 A | 2/2012 |
| JP | 2013191209 A | 9/2013 |

OTHER PUBLICATIONS

Office action for U.S. Appl. No. 14/527,696, dated May 6, 2016, Ye, "Authentication for Application", 16 pages.
PCT Search Report and Written Opinion dated Mar. 2, 2015 for PCT Application No. PCT/US14/62999, 9 Pages.
Translated copy of the Japanese Office Action dated Aug. 28, 2018 for Japanese patent application No. 2016-520661, a counterpart foreign application of U.S. Pat. No. 9,544,279, 15 pages.

* cited by examiner

AUTHENTICATION FOR APPLICATION

CROSS REFERENCE TO RELATED PATENT APPLICATIONS

This application is a continuation of U.S. application Ser. No. 14/527,696 filed on Oct. 29, 2014, which claims foreign priority to Chinese Patent Application No. 201310526656.2 filed on 30 Oct. 2013, entitled "Method, Terminal, and System for Authentication for Application," which applications are hereby incorporated by reference in their entirety.

TECHNICAL FIELD

The present disclosure relates to the communication field, and, more especially, relates to a method, terminal, and system for authentication for application.

BACKGROUND

With the development of communication technology, mobile terminals are more and more favored by a lot of users, and functions of the mobile terminal are becoming more and more powerful. Specifically mobile phones have been developed into an intelligent mobile phone stage and are comparable to computers. At present, there are various applications (App) for a variety of mobile terminals. However, when users use the Apps at mobile terminals such as the mobile phones, there are various authentication operations. For example, when logging into a user account, a user needs to enter a password for authentication. When doing data interaction with another user, the user needs to enter an authentication code sent by a third party interactive platform.

There are several conventional authentication methods for data interaction by using applications at or through the terminals.

A first authentication method is using a user password. The user sets a login password or data interaction password for a user account. The user needs to enter the preset password when entering into the account or conducting data interaction. The third party interactive platform authenticates the log-in operation or data interactive operation of the user after determining that the password is correct. However, the applications at the mobile terminal are often set up to remember passwords for the convenience of the user. When the mobile terminal of the user is used by another person due to loss of the devices, as the applications remember the password, such applications may be abused by another person and cause loss of personal interests of the user.

A second authentication method is using a one-time password (OTP). To validate the data interaction, the user needs to input a dynamic code of a dynamic password card or hardware token (e.g., a string of characters including numbers and characters). The third party interactive platform conducts the data interaction after determining that the OTP is correct. This method requires the user to have one more step(s) of inputting the OTP in addition to the normal data interactive process, thereby increasing complexity and reducing user experiences.

A third authentication method is using an OTP authentication based on short message. This method is a type of the OTP authentication and is mainly used at mobile phones. When the user needs to conduct the data interaction, the user needs to obtain the OTP from the third party interactive platform through the mobile phone that is bound with the user account in a form of short message and inputs the correct OTP at an interactive page. However, when the mobile phone is lost, such authentication method cannot be used and may cause the failure of data interaction within a short period of time.

Thus, an authentication method that secures the application at the terminal of the user is needed.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

The present disclosure provides a method, terminal, and system for authentication for application to resolve security problems of applications operated on terminals under the conventional techniques.

The present disclosure provides an example method for authentication for an application. The method may be applicable in near-field communication. When a particular operation is triggered, a near-field device within a certain distance of a terminal is detected. An identification of the near-field device is obtained. The identification is sent to a server to request the server to determine whether the near-field device is a particular near-field device corresponding to the particular operation. A result of authentication performed by the server according to the identification is obtained. A following processing is applied to the particular operation according to the result of authentication.

The present disclosure also provides an example terminal with near-field communication function. The terminal may include a detecting module, an obtaining module, a sending module, a receiving module, and a processing module. The detecting module, when a particular operation is triggered, detects a near-field device within a certain distance of the terminal. The obtaining module obtains an identification of the near-field device. The sending module sends the identification to a server to request the server to determine whether the near-field device is a particular near-field device corresponding to the particular operation. The receiving module receives a result of authentication performed by the server according to the identification. The processing module applies a following processing to the particular operation according to the result of authentication.

The present disclosure also provides an example terminal system including a terminal with near-field communication function and a particular near-field device corresponding to the terminal. The terminal may include a detecting module, an obtaining module, a receiving module, and a processing module. The detecting module, when a particular operation is triggered, detects a near-field device within a certain distance of the terminal. The obtaining module obtains an identification of the near-field device. The sending module sends the identification to a server to request the server to determine whether the near-field device is the particular near-field device corresponding to the particular operation. The receiving module receives a result of authentication performed by the server according to the identification. The processing module applies a following processing to the particular operation according to the result of authentication.

The particular near-field device and the terminal may have the same near-field communication function.

Compared with the conventional techniques, the present techniques authenticate whether a current operation is a normal operation (or the operation of the user) by determining whether the near-field device corresponding to the particular operation exists. If an authentication of the near-field equipment fails, the current operation is terminated and a preset secured operation is implemented, thereby ensuring a safe use of the application.

BRIEF DESCRIPTION OF THE DRAWINGS

The FIGs. are used to further illustrate the present disclosure and are a part of the present disclosure. The example embodiments and their explanations are used to illustrate the present disclosure and shall not be construed as a limit to the present disclosure.

DETAILED DESCRIPTION

The present disclosure provides an example method for authentication for an application. The present techniques use a near-field communication function of a terminal and, when a particular operation of an application at the terminal is triggered, determine whether to release the particular operation through determining whether there is a particular near-field device corresponding to the particular operation within an effective near-filed communication distance of the terminal, thereby ensuring a safety of using the application at the terminal.

In order to better illustrate the purpose, technical scheme, and advantage of the present disclosure, the present techniques are described by reference to example embodiments and corresponding FIGs. Certainly, the described example embodiments are only a portion of embodiment of the present disclosure and are not all of the embodiments of the present disclosure. Any other embodiment that one of ordinary skill in the art obtains without using creative efforts based on the embodiment of the present disclosure falls under the scope of protection of the present disclosure.

The present disclosure provides an example method for application authentication. The method may be applicable to a terminal with near-field communication function, especially a mobile terminal such as a mobile phone and a tablet. The near-field communication function may include, but is not limited to, a Bluetooth communication (Bluetooth) function, a near-field wireless communication function (NFC), and a radio frequency identification (RFID) function. The terminal may be a terminal with one or more of the near-field communication functions.

Figure 1:
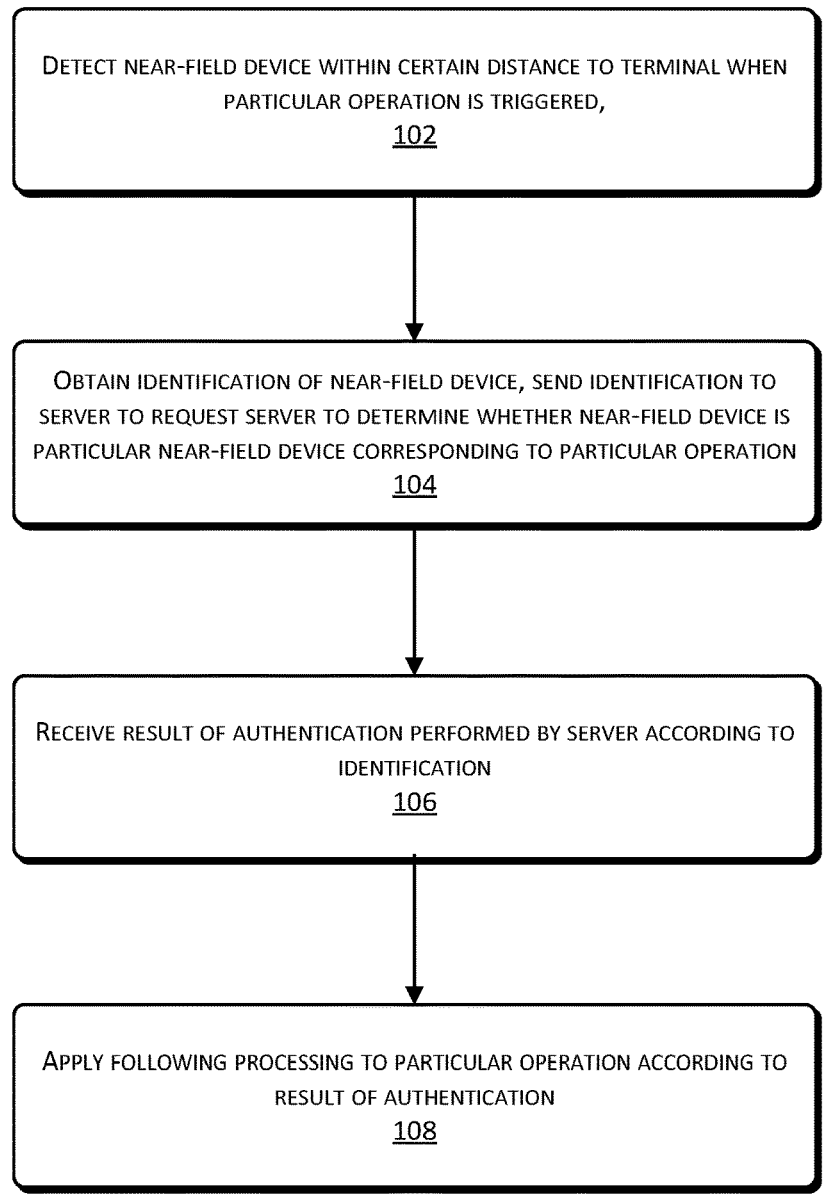
FIG. 1 is a flowchart illustrating an example authentication method according to the present disclosure.

Referring to FIG. 1, FIG. 1 is a flowchart illustrating an example authentication method according to the present disclosure.

At 102, when a particular operation is triggered, a near-field device within a certain distance to the terminal is detected. For example, within an effective near-field communication distance to the terminal, the present techniques may search for whether there is a near-field device that has the same near-filed communication type as the terminal.

At 104, an identification of the near-field device is obtained. The identification is sent to a server to request the server to determine whether the near-field device is a particular near-field device corresponding to the particular operation.

At 106, a result of authentication performed by the server according to the identification is received. That is, the result of authentication, returned by the server, whether the near-field device is the particular near-field device corresponding to the particular operation is received.

At 108, a following processing is applied to the particular operation according to the result of authentication. That is, according to the result of authentication that the server determines whether the near-field device is the particular near-field device corresponding to the particular operation, the following processing is applied to the particular operation.

For example, if the result of authentication is that the near-field device is the particular near-field device corresponding to the particular operation, the particular operation is performed. If the result of authentication is that the near-field device is not the particular near-field device corresponding to the particular operation, a preset safety operation is performed.

Figure 2:
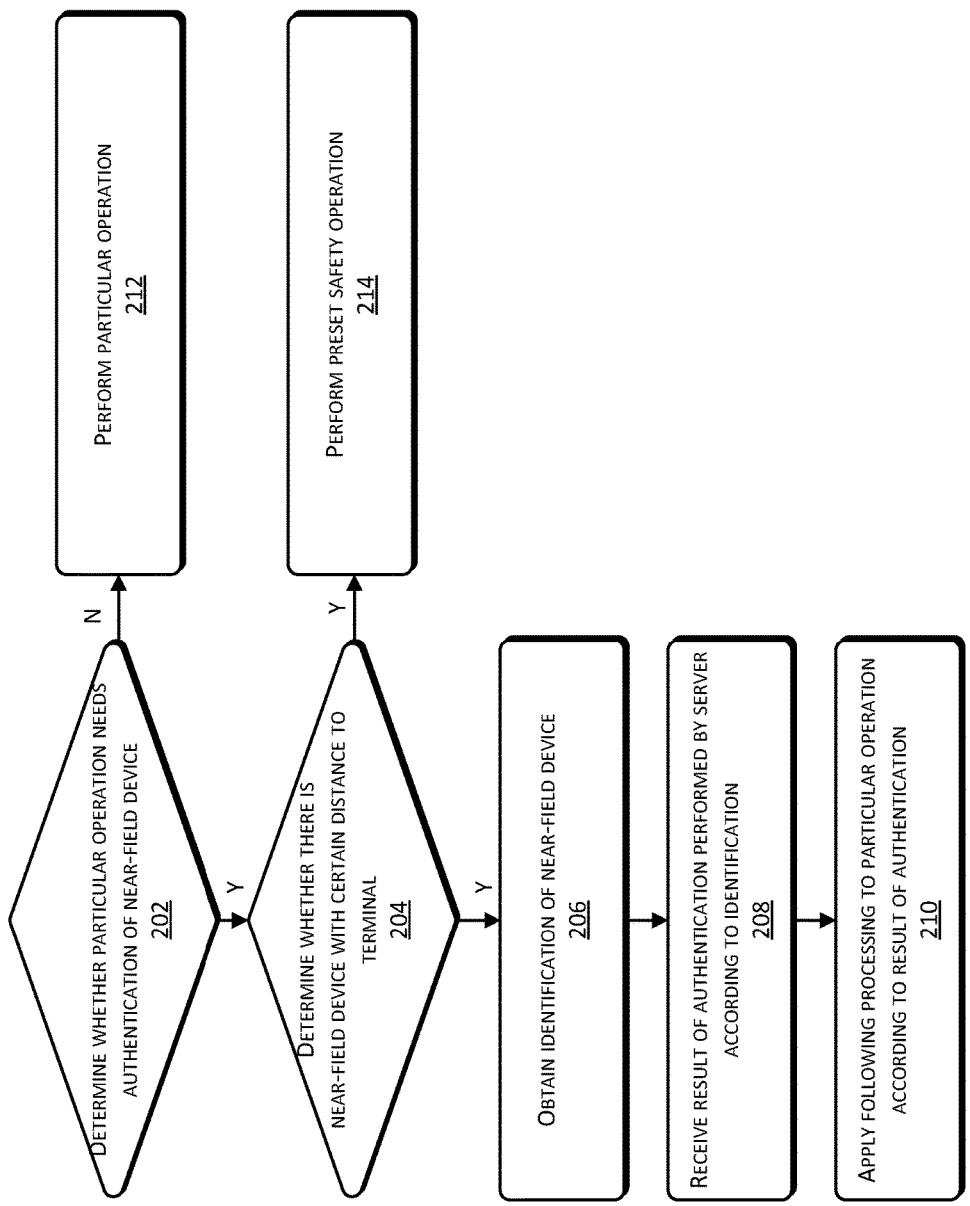
FIG. 2 is a flowchart illustrating an example implementation of the authentication method according to the present disclosure.

To more clearly describe the technical scheme of the example embodiment of the present disclosure, the following more detailed descriptions are provided by reference to FIG. 2.

FIG. 2 is a flowchart illustrating an example implementation of the authentication method according to the present disclosure.

At 202, when a particular operation is triggered, the present technique determines whether there needs an authentication of a near-field device for the particular operations. In other words, whether the authentication of the near-field device for the particular operation is needed is firstly determined.

For example, whether the authentication of the near-field device for the particular operation is needed may be preset and stored in the server. For instance, the user may use a user account to log into the application through another terminal to set whether the authentication of the near-field device for the particular operation is needed. Another terminal may be a desktop computer or a portable computer. For instance, the user may log into the application via the desktop computer and set that the application needs the authentication of the near-field device with respect to the particular operation. In addition, a particular near-field device corresponding to the particular operation may be preset. That is, the particular operation and an identification of the particular near-field device have a corresponding relationship. In fact, the user account that sets the particular operations that needs the authentication of the near-field device is bound with the particular near-field device. (For instance, the corresponding relationship between the particular operation and the identification of the particular near-field device is set by the user through logging into the user account of the application. Thus, the particular near-field device also corresponds to the user account.)

The particular near-field device may be specified by the user. The corresponding relationship between the particular near-field device and the particular operation may be set through an interaction between the terminal and the server. The server includes a storage device of data information of the application at a back-end. A display and processing of the application are implemented through data interaction with the server. The identification of the particular near-field device is stored at the server to determine whether the particular near-field device that has the identification is the particular near-field device corresponding to the particular operation.

The near-field communication function may include, but is not limited to, a Bluetooth communication (Bluetooth) function, a near-field wireless communication (NFC) function, a radio frequency identification (RFID) function. The particular near-field device and the terminal may have the same near-field communication mode so that the particular near-field device and the terminal may have near-field communication. For example, with respect to the mobile terminal that has the Bluetooth communication function, the particular near-field device may be a device that has the Bluetooth communication function such as a Bluetooth earphone or a Bluetooth mouse. The particular near-field device may be the same type of device as that of the terminal. For example, when the terminal is a mobile phone with Bluetooth function, the particular near-field device may also be the mobile phone with Bluetooth function. In such circumstances, these two terminals are near-field devices to each other. In other words, when the application is used at one terminal, the other terminal may be used as the particular near-field device, and vice versa. There may be one or more particular near-field devices. In other words, one or more particular near-field devices may be set corresponding to the particular operation (such as the particular operation of the application for the user that is identified by the user account). The identification of the particular near-field device may be used to bind the corresponding relationship between the particular operation and the particular near-field device.

The identification of the near-field device may be a physical address of the near-field device (such as a MAC address), a name of the near-field device defined by the user. For example, the MAC address of the particular near-field device may be stored at the server. When the near-field device is authenticated, the terminal obtains the MAC address of the near-field device and uploads it to the server. The server inquires whether the MAC address of the near-field device to be authenticated matches the MAC address of the particular near-field device, stored at the server, corresponding to the particular operation and thus authenticates whether the near-field device to be authenticated is the particular near-field device corresponding to the particular operation. When the near-field device is a Bluetooth device, the identification may be a Bluetooth device address. Each Bluetooth transceiver and receiver is assigned a unique 48 bit device address. The device address includes a 24 bit LAP domain, a 16 bit NAP domain, and an 8 bit UAP domain. The Bluetooth device address of the Bluetooth device may be stored at the server. When the near-field device is authenticated, the terminal obtains the Bluetooth device address of the near-field device and uploads it to the server. The server inquires whether the Bluetooth device address of the Bluetooth device to be authenticated matches the Bluetooth device address of the particular Bluetooth device, stored at the server, corresponding to the particular operation and thus authenticates whether the Bluetooth device to be authenticated is the particular Bluetooth device corresponding to the particular operation.

According to an example embodiment of the application, whether the particular operation needs authentication of the particular near-field device may not be set through the terminal that is currently used to ensure that another operator cannot freely change the setting when the device is operated by another person due to lost of the user or any other reason. Another terminal may be a personal computer (such as the desktop computer or the portable computer), smart phone, and tablet. Another terminal may be the personal computer preferably. When the user needs to set whether the particular operation needs authentication of the particular near-field device through a certain terminal, the server identifies a device type of the terminal and determines whether the setting becomes effective according to the device type. In other words, the server determines whether the type of the terminal is a designated device type that needs authentication of the near-field device corresponding to the particular operation. If the result is positive, the setting is stored at the server. Otherwise, the setting is void.

According to an example embodiment of the present disclosure, the corresponding relationship between the particular operation and the identification of the particular near-field device may be preset. In other words, the identification of the particular near-field device is used to pre-combine the particular operation and the particular near-field device. When the user triggers the particular operation again, the authentication of the near-field device is conducted with respect to the particular operation. The preset corresponding relationship between the particular operation and the particular near-filed device is stored at the server.

For example, the setting of the application by the user may be stored at the server. The authentication of the near-field device for the particular operation may be set as a function of the application, which is referred to as the near-field authentication function. The setting of the user to the near-field authentication function of the application for the particular operation (or setting data) may be stored at the server. The setting may include saving an open and close status of the near-field authentication function (or status data), saving the identification of the particular near-field device that is bound with the terminal in advance. When the user triggers the particular operation of the application through another terminal, the server checks the setting of the near-field authentication function that the user sets for the application. If the user does not open the near-field authentication function for the particular operation, such when the user firstly triggers the particular operation of the application (when the user does not open the near-field authentication function for the particular operation), the server prompts the user whether to set the authentication of the near-field device for the particular operation. In other words, the server reminds the user whether to open the near-field authentication function for the particular operation. If the user selects to open the near-field authentication function, the server reminds the user to set one or more particular near-field devices corresponding to the particular operation. It should be noted that, when setting whether the particular operation of the application needs the near-field device authentication, the user is not restricted to make the setting at another terminal when the user firstly triggers the particular operation of the application. In other words, the user may modify the setting of the near-field device authentication for the particular operation at another terminal based on personal needs.

The particular operation may be one or more operations of the application, such as a logging-in operation when the application is logged into, a payment confirmation operation for making payment. In addition, one or more operations of the application may be set as the particular operation through logging into the application. When the user opens the application and triggers any operation, if the operation is the preset particular operation, the present techniques may inquire whether the near-field authentication is required for the particular operation to determine whether the near-field authentication should be applied for the particular operation.

When the particular operation of the application is triggered, an inquiry request whether the particular operation needs near-field device authentication is sent to the server. The present techniques determine whether the particular operation needs the near-field device authentication based on an inquiry result returned by the server. Whether the particular operation needs the near-field device authentication is preset and stored at the server. After receiving the inquiry request, the server inquires whether the user sets the near-field device authentication for the particular operation and returns the inquiry result. Thus, based on the inquiry result returned by the server, the present techniques determine whether to conduct authentication of the near-field device for the particular operation.

For example, when the user uses a payment application for payment, after the user clicks a button to confirm payment (such payment confirmation operation may be preset as the particular operation), the application sends the inquiry request to the server to request the server to inquire whether the user sets that the payment confirmation operation needs the authentication of the near-field device, thereby determining whether to conduct the authentication of the near-field device for the payment confirmation operation.

If the particular operation does not need the authentication of the near-field device, operations at 212 are performed. The particular operation is performed. In other words, the particular operation triggered by the user is implemented.

If the particular operation needs the authentication of the near-field device, operations at 204 are performed. At 204, the near-field device within a certain distance to the terminal is detected. For example, the present techniques may search whether there is the near-field device within the effective near-field communication distance to the terminal.

The terminal and the near-field device may have the same near-field communication. The terminal may have more than one near-field communication mode (such that the terminal may have both Bluetooth function and NFC function). Thus, the terminal needs to have the same near-field communication mode as the near-field device to conduct the near-field communication when the near-field device is authenticated. For example, the near-field communication mode may be Bluetooth communication and the near-field device may be a Bluetooth earphone. The certain distance is the effective near-field communication distance. The terminal needs to be within the certain distance to the near-field device for communication. Thus, the near-field device may be searched and the terminal may be matched to the near-field device for communication. In other words, when the near-field device corresponding to the particular operation is within the effective near-field communication distance to the terminal, the terminal may start to search the near-field device.

For example, the application is opened on the mobile phone with Bluetooth function. As the effective Bluetooth communication distance in general is about 10 meters, when the particular operation of the application is used, the Bluetooth device that is bound with particular operation needs to be within 10 meters of the terminal. Thus, the mobile phone is capable to search the Bluetooth device and obtains device information, such as a device identification, of the device through matching with the device. As the effective distance of Bluetooth communication in general is about 10 meters, the user only needs to carry the Bluetooth device (such as the Bluetooth earphone) corresponding to the mobile phone and does not need to let the Bluetooth earphone be close to the mobile phone.

If the near-field device exists within the certain distance to the terminal, operations at 206 are performed.

At 206, the identification of the near-field device is obtained. The identification is sent to the server to request the server to determine whether the near-field device is the particular near-field device corresponding to the particular operation.

The server stores the preset corresponding relationship between the particular operation and the identification of the particular near-field device. If a search result shows that there is the near-field device within the effective near-field communication distance to the terminal, through a mapping with the near-field device, the terminal starts the near-field communication with the near-field device and further obtains the identification of the near-field device. After the identification of the near-field device is obtained, the terminal sends the identification to the server and requests the server to inquire whether the near-field device is the particular near-field device corresponding to the particular operation, i.e., the preset near-field device bound with the particular operation.

When receiving the requests to authenticate whether the near-field device is the particular near-field device corresponding to the particular operation, the server authenticates according to the received identification sent by the terminal and the corresponding relationship between the particular operation and the identification of the particular near-field device and returns a result of authentication.

For example, the server stores the preset corresponding relationship between the particular operation and the identification of the particular near-field device. When the identification of the near-field device sent by the terminal is received, the server compares the identification with the identification of the particular near-field device corresponding to the particular operation stored at the server to authenticate whether the near-field device is the particular near-field device corresponding to the particular operation and return the result of the authentication. If the identification of the near-field device matches the identification of the particular near-field device corresponding to the particular operation, the near-field device is the particular near-field device corresponding to the particular operation. That is, there exits the particular near-field device corresponding to the particular operation within the effective near-field communication distance. If the identification of the near-field device does not match the identification of the particular near-field device corresponding to the particular operation, the near-field device is not the particular near-field device corresponding to the particular operation. That is, there is no particular near-field device corresponding to the particular operation within the effective near-field communication distance.

The identification of the near-field device may be a physical address of the near-field device (such as a MAC address), a name of the near-field device defined by the user. The identification may be stored at the server. For example, the MAC address of the near-field device may be used to bind the near-field device with terminal. The MAC address of the near-field device is stored at the server. When the near-field device is authenticated, the MAC address of the near-field device is sent to the server to request the server to authenticate whether the found near-field device is the particular near-field device bound with the particular operation. The server, according to the MAC address and the corresponding relationship, which is stored at the server, between the MAC address that the particular near-field device corresponding to the particular operation, authenticates whether the near-field device is the particular near-field device corresponding to the particular operation and returns the result of authentication.

At 208, the result of authentication performed by the server according to the identification is obtained. That is, the result of authentication, returned by the server, whether the near-field device is the particular near-field device corresponding to the particular operation is received.

At 210, a following processing is applied to the particular operation according to the result of authentication. That is, according to the result of authentication that the server determines whether the near-field device is the particular near-field device corresponding to the particular operation, the following processing is applied to the particular operation.

The operations at 210 may include two scenarios. At one scenario, when the result of authentication is that the near-field device is the particular near-field device corresponding to the particular operation, the particular operation is performed. At another scenario, if the result of authentication is that the near-field device is not the particular near-field device corresponding to the particular operation, a preset safety operation is performed.

For example, the user opens the application through the terminal. The particular near-field device bound with the particular operation is a Bluetooth earphone. When the user opens the application at the terminal and triggers the logging-in operation (such logging-in operation may be preset as the particular operation), the inquiry request is sent to the sever and the returning result from the server is that the authentication of the device is required for the logging-in operation. The terminal uses the same near-field communication mode as the near-field device. In other words, a Bluetooth device is searched with the effective near-field communication distance to the terminal. If the Bluetooth device is found within the effective near-field communication distance to the terminal, a MAC address of the Bluetooth device is obtained. The MAC address is sent to the server to request the server to inquire whether the Bluetooth device is the particular Bluetooth device corresponding to the particular operation. The server, after receiving the MAC address, compares it with the previously stored MAC address of the Bluetooth earphone of the terminal. If a result returned by the server is that the two MAC addresses match, the Bluetooth device is the Bluetooth earphone corresponding to the particular operation. That is, the authentication of the near-field device is successful. If the result returned by the server is that the two MAC addresses do not match, the Bluetooth device is not the Bluetooth earphone corresponding to the particular operation. That is, the authentication of the near-field device is not successful. The preset safety operations are performed.

For example, the user may use the payment application at the terminal. When the user clicks a "confirmation of payment" button (a payment confirmation operation may be preset as the particular operation), if the user sets that authentication of the near-field device is required for the payment application, the present techniques search whether there is the near-field device that has the same near-field communication function as the terminal within the effective near-field communication distance, obtains the identification of the found near-field device, and sends the identification to the server to request the server to authenticate whether the device is the particular near-field device corresponding to the payment confirmation operation. In other words, the present techniques search whether there exists the particular near-field device corresponding to the particular operation within the effective near-field communication distance to the terminal. If there does not exist such near-field device, the authentication fails and the preset safety operations are performed. For example, the near-field device that has the same near-field communication mode with the terminal is not found with the effective near-field communication distance to the terminal. Alternatively, the found near-field device is not the particular near-field device bound the particular operation. Such failures of authentication may indicate that the payment confirmation operation is an abnormal operation (for example, another person may abuse the terminal of the user when the terminal of the user is lost).

At 204, if no near-field device is detected within the certain distance to the terminal, or there is no particular near-field device corresponding to the particular operation within the effective near-field communication distance to the terminal, operations at 214 are performed. The preset safety operation is performed.

The preset safety operation may include one or more of the following operations: to lock the terminal, to clear the password in the memory of the terminal, and to notify another terminal.

For example, when the particular near-field device is not found within the effective communication distance to the terminal, or the authentication of the near-field device fails, the terminal may be locked. For instance, when the terminal is the mobile phone, the currently triggered particular operation is terminated and a screen of the mobile phone is locked. That is, a preset screen lock password needs to be input to unlock it so that the current operator may not continue to use the mobile phone.

For another example, the password stored at the terminal may be cleared or the application may be deleted or uninstalled. For instance, when the user logs into the application, for the convenience of following logging-in, the user often sets that the application remembers the log-in password. If the mobile phone of the user is lost, another person may use the password stored at the mobile phone to log into and use the application. Thus, when the authentication of the near-field device fails, the current operation is terminated and the password in the memory is cleared. Although the log-in password is correct, as the authentication of the near-field device at the mobile phone fails, the mobile phone terminates the currently triggered particular operation (such that the mobile phone does not send a request to log into the application to the server). Thus, the current operator still cannot successfully log into the user's account of the application.

For another example, another terminal may be notified. The use may set that, when the authentication of the near-field device fails, a reminder is automatically sent to another terminal. For instance, if the mobile phone of the user is lost, when another person uses the application on the mobile phone of the user for the particular operation, as there is no particular near-field device corresponding to the mobile phone (such as a Bluetooth phone), the authentication of the near-field device fails. The mobile phone of the user sends the reminder in one or more forms such as a short text message to another terminal. For instance, the user may set a number of another mobile phone as a phone number to send the reminding short text message. When the authentication of the near-field device fails, the reminding short text message is automatically sent to the number of another phone. Thus, the present techniques not only ensure the use safety of the application but also remind the user when the user is unaware that the user's mobile phone is lost. In addition, when the authentication of the near-field device fails, a Global Positioning System (GPS) may be opened for localization and a camera (such as a front-end camera) may be used to capture a photo. The current position information of the terminal through a localization technique or the photo capture by the camera is sent to another terminal in one or more forms such as a reminding short text message. Thus, information of the current location of the terminal is obtained so that the user may find the terminal.

According to an example embodiment of the present disclosure, the authentication of the near-field device may be configured as a hidden process. That is, in the authentication process, no prompt is shown in the page of the application to show any authentication of the near-field device. Thus, the current operator is not aware of the ongoing authentication operation.

Figure 3:
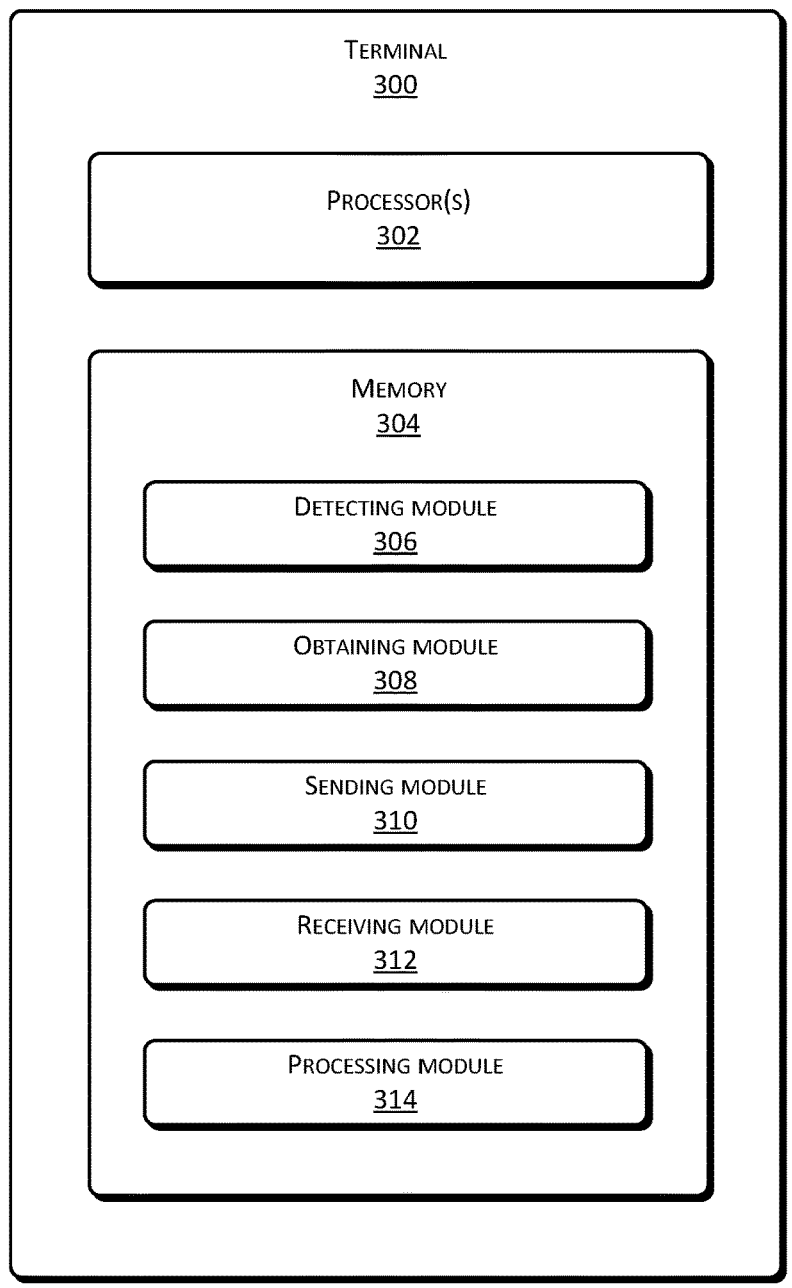
FIG. 3 is a diagram illustrating an example terminal with near-field communication function according to the present disclosure.

The present disclosure also provides an example terminal with near-field communication function. FIG. 3 is a diagram illustrating an example terminal 300 with near-field communication function according to the present disclosure. For example, the terminal 300 may include one or more processor(s) 302 or data processing unit(s) and memory 304. The memory 304 is an example of computer-readable media. The memory 304 may store therein a plurality of modules including a detecting module 306, an obtaining module 308, a sending module 310, a receiving module 312, and a processing module 314.

The detecting module 306, when a particular operation is triggered, detects a near-field device within a certain distance of the terminal. The obtaining module 308 obtains an identification of the near-field device. The sending module 310 sends the identification to a server to request the server to determine whether the near-field device is a particular near-field device corresponding to the particular operation. The receiving module 312 receives a result of authentication performed by the server according to the identification. The processing module 314 applies a following processing to the particular operation according to the result of authentication.

According to an example embodiment of the present disclosure, if the result of authentication is that the near-field device is the particular near-field device corresponding to the particular operation, the processing module 314 may further perform the particular operation. If the result of authentication is that the near-field device is not the particular near-field device corresponding to the particular operation, the processing module 314 may perform a preset safety operation.

According to an example embodiment of the present disclosure, the terminal 300 may also include a determining module (not shown in FIG. 3) that, when the particular operation is triggered, sends a request to the server to inquire whether the particular operation needs conducts the authentication of the particular near-field device, and determines whether to conduct the authentication of the near-field device for the particular operation according to a result returned by the server.

According to an example embodiment of the present disclosure, the detecting module 306 further detects the near-field device within the certain distance of the terminal. The obtaining module 308 obtains the identification of the near-field device if the near-field device exists. The processing module 314 performs the preset safety operation if the near-field device does not exist.

For example, the certain distance may be an effective near-field communication distance to the terminal.

For example, the preset safety operation may include one or more of the following operations: to lock the terminal, to clear the password in the memory of the terminal, and to notify another terminal.

Figure 4:
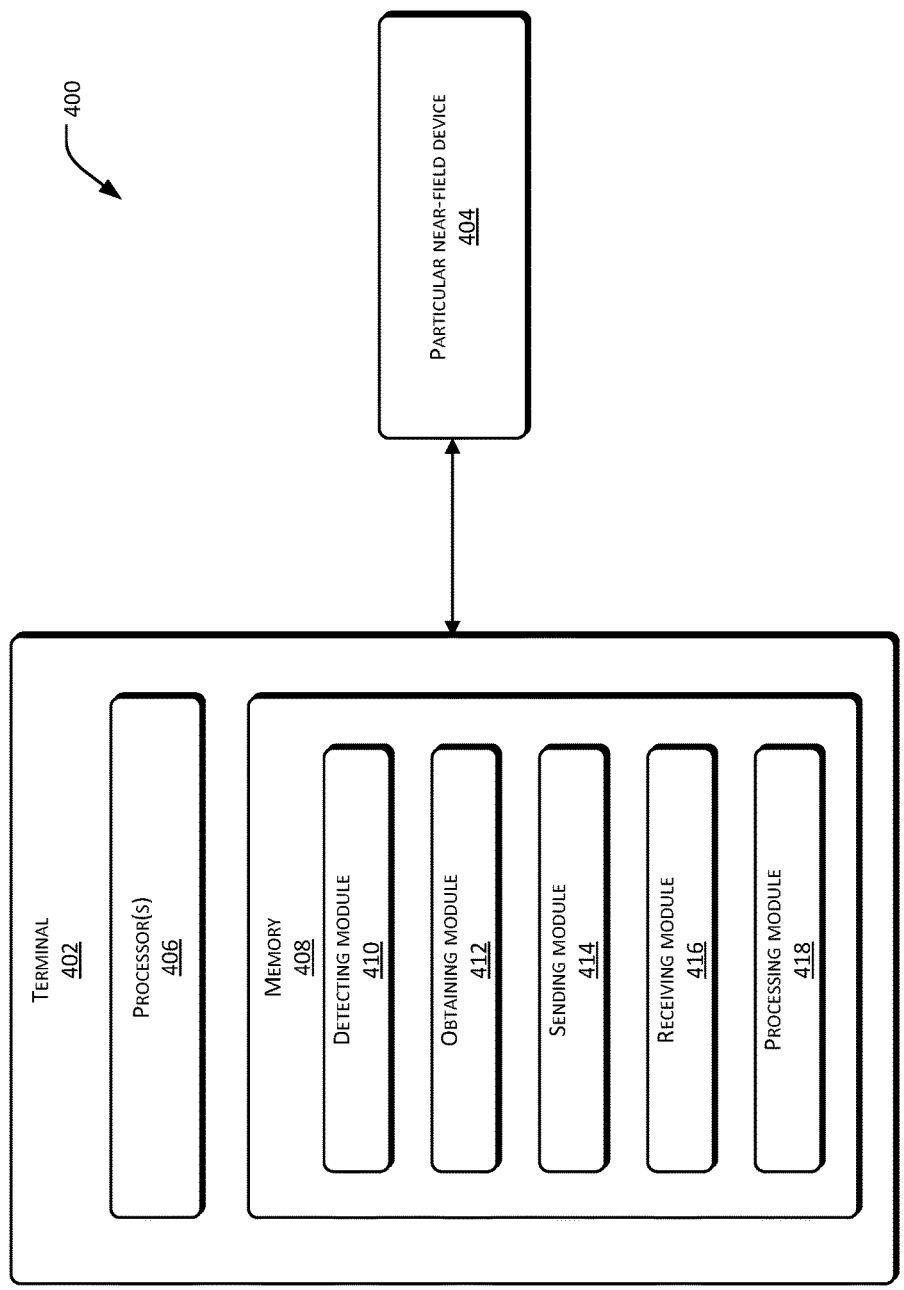
FIG. 4 is a diagram illustrating an example terminal system according to the present disclosure.

FIG. 4 is a diagram illustrating an example terminal system 400 according to the present disclosure. As shown in FIG. 4, the terminal system 400 includes a terminal 402 with near-field communication function and a particular near-field device 404 corresponding to the terminal.

The terminal 402 may include one or more processor(s) 406 or data processing unit(s) and memory 408. The memory 408 is an example of computer-readable media. The memory 408 may store therein a plurality of modules including a detecting module 410, an obtaining module 412, a sending module 414, a receiving module 416, and a processing module 418.

The detecting module 410, when a particular operation is triggered, detects a near-field device within a certain distance of the terminal. The obtaining module 412 obtains an identification of the near-field device. The sending module 414 sends the identification to a server to request the server to determine whether the near-field device is a particular near-field device corresponding to the particular operation. The receiving module 416 receives a result of authentication performed by the server according to the identification. The processing module 418 applies a following processing to the particular operation according to the result of authentication.

The particular near-field device 404 and the terminal 402 may have the same near-field communication function. For example, the near-field communication may be the Bluetooth communication. The particular near-field device may be the Bluetooth earphone.

As the operations implement by the terminal and the terminal system are similar to those as described in FIGS. 1 and 2 and their corresponding paragraphs in the example method embodiments, details of the example terminal embodiment and the example terminal system embodiment may refer to relevant portions in the example embodiments and are not described herein for the purpose of brevity.

In a standard configuration, a computing device, such as the server, the terminal or the near-field device, as described in the present disclosure may include one or more central processing units (CPU), one or more input/output interfaces, one or more network interfaces, and memory.

The memory may include forms such as non-permanent memory, random access memory (RAM), and/or non-volatile memory such as read only memory (ROM) and flash random access memory (flash RAM) in the computer-readable media. The memory is an example of computer-readable media.

The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device.

As defined herein, the computer-readable media does not include transitory media such as a modulated data signal and a carrier wave.

It should be noted that the term "including," "comprising," or any variation thereof refers to non-exclusive inclusion so that a process, method, product, or device that includes a plurality of elements does not only include the plurality of elements but also any other element that is not expressly listed, or any element that is essential or inherent for such process, method, product, or device. Without more restriction, the elements defined by the phrase "including a . . . " does not exclude that the process, method, product, or device includes another same element in addition to the element.

One of ordinary skill in the art would understand that the example embodiments may be presented in the form of a method, a system, or a computer software product. Thus, the present techniques may be implemented by hardware, computer software, or a combination thereof. In addition, the present techniques may be implemented as the computer software product that is in the form of one or more computer storage media (including, but is not limited to, disk, CD-ROM, or optical storage device) that include computer-executable or computer-readable instructions.

The above description describes the example embodiments of the present disclosure, which should not be used to limit the present disclosure. One of ordinary skill in the art may make any revisions or variations to the present techniques. Any change, equivalent replacement, or improvement without departing the spirit and scope of the present techniques shall still fall under the scope of the claims of the present disclosure.

What is claimed is:

1. A method comprising:
    detecting a near-field device of a user by a terminal when a particular operation is triggered;
    obtaining an identification of the near-field device;
    sending the identification of the near-field device to a server to request the server to conduct an authentication of the near-field device that matches the near-field device with a particular near-field device corresponding to the particular operation according to the identification of the near-field device;
    receiving a result of authentication performed by the server according to the identification of the near-field device; and
    sending a notification by the near-field device to another device used by the user in response to receiving the result of failed authentication.

2. The method of claim 1, further comprising applying a following process to the particular operation according to the result of authentication.

3. The method of claim 2, wherein the applying the following process to the particular operation according to the result of authentication comprises, if the result of authentication is that the near-field device is the particular near-field device corresponding to the particular operation, performing the particular operation.

4. The method of claim 2, wherein the applying the following process to the particular operation according to the result of authentication comprises, if the result of authentication is that the near-field device is not the particular near-field device corresponding to the particular operation, performing one or more preset safety operations.

5. The method of claim 4, wherein the one or more safety operations include one or more of the following operations:
    locking the terminal; and
    clearing a password in memory of the terminal.

6. The method of claim 1, further comprising:
    in response to determining that there is no near-field device near the terminal when the particular operation is triggered, performing one or more preset safety operations.

7. The method of claim 1, further comprising storing a corresponding relationship between the particular operation and the particular near-field device corresponding to the particular operation at the server.

8. The method of claim 7, wherein the sending the identification of the near-field device to a server to request the server to conduct the authentication of the near-field device that matches the near-field device with a particular near-field device corresponding to the particular operation according to the identification of the near-field device comprises:
    requesting the server to conduct the authentication of the near-field device based on the identification of the near-field device and the corresponding relationship between the particular operation and the particular near-field device corresponding to the particular operation at the server.

9. The method of claim 1, further comprising:
    sending an inquiry to the server to inquire whether the particular operation needs the authentication of the near-field device; and
    determining to conduct the authentication of the near-field device according to an inquiry result returned by the server.

10. The method of claim 9, further comprising storing the particular operation that needs authentication of the particular near-field device at the server.

11. The method of claim 1, wherein the detecting the near-field device near the terminal when a particular operation is triggered comprises detecting the near-field device within an effective near-field communication distance to the terminal.

12. The method of claim 1, wherein the near-field device and the terminal have a same near-field communication mode.

13. The method of claim 1, wherein the near-field communication mode includes one or more of the following:
    a Bluetooth communication (Bluetooth);
    a near-field wireless communication (NFC) function; and
    a radio frequency identification (RFID).

14. The method of claim 1, wherein the near-field device is a Bluetooth earphone.

15. A terminal comprising:
    one or more processors; and
    a memory including instructions executable by the one or more processors, which when executed perform the following acts comprising:
        detecting a near-field device of a user by a terminal, when a particular operation is triggered;
        obtaining an identification of the near-field device;
        sending the identification to a server to request the server to conduct an authentication of the near-field device that matches the near-field device with a particular near-field device corresponding to the particular operation according to the identification of the near-field device;
        receiving a result of authentication performed by the server according to the identification; and
        sending a notification by the near-field device to another device used by the user in response to receiving the result of failed authentication.

16. The terminal of claim 15, the acts further comprising performing the particular operation if the result of authentication is that the near-field device is the particular near-field device corresponding to the particular operation, or performing one or more preset safety operations if the result of authentication is that the near-field device is not the particular near-field device corresponding to the particular operation.

17. The terminal of claim 15, the acts further comprising sending an inquiry to the server to inquire whether the particular operation needs authentication of the near-field device and determining to conduct the authentication of the near-field device according to an inquiry result returned by the server.

18. The terminal of claim 15, wherein the detecting the near-field device within an effective near-field communication distance to the terminal.

19. A system comprising:
a terminal including:
one or more processors; and
a memory including instructions executable by the one or more processors, which when executed perform the following acts comprising:
detecting a near-field device of a user by the terminal, when a particular operation is triggered;
obtaining an identification of the near-field device;
sending the identification to a server to request the server to conduct an authentication of the near-field device that matches the near-field device with a particular near-field device corresponding to the particular operation according to the identification of the near-field device; and
receiving a result of authentication performed by the server according to the identification; and
sending a notification by the near-field device to another device used by the user in response to receiving the result of failed authentication; and
the near-field device.

20. The terminal system of claim 19, wherein:

the near-field communication mode is a Bluetooth communication; and the near-field device is a Bluetooth earphone.

* * * * *